Nov. 13, 1928.
R. D. EVANS
1,691,342
MEASURING INSTRUMENT
Filed July 31, 1924
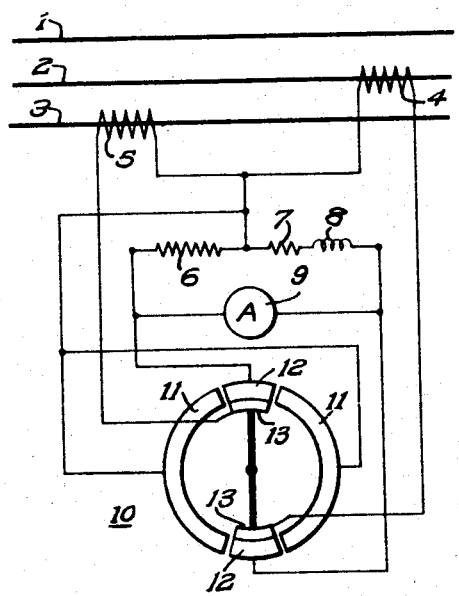
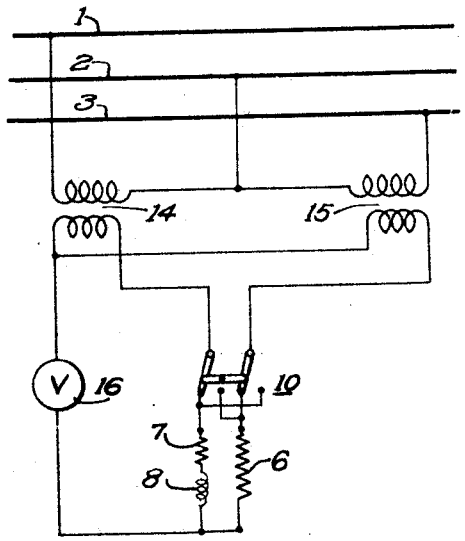
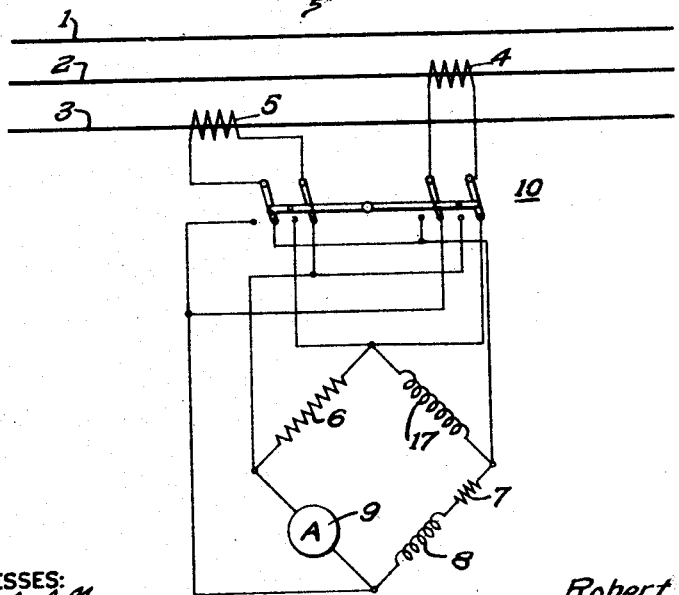
WITNESSES:
INVENTOR
Robert D. Evans.
BY
ATTORNEY Patented Nov. 13, 1928.

1,691,342

UNITED STATES PATENT OFFICE.

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

MEASURING INSTRUMENT.

Application filed July 31, 1924. Serial No. 729,222.

My invention relates to measuring instruments and particularly to instruments for measuring the symmetrical components of alternating-current circuit quantities.

One object of my invention is to provide an instrument having a single electro-responsive device adapted to indicate either the positive or the negative sequence component of a polyphase quantity, such as current or voltage.

Another object of my invention is to provide a switch, an electrical network and an indicating instrument so connected to the conductors of a polyphase circuit that upon operating the switch, either the positive or the negative sequence component of a polyphase quantity may be measured, as desired.

In practicing my invention, I provide means such as a static network similar to that disclosed in my prior Patent No. 1,535,587, dated April 28, 1925, for segregating the positive and the negative sequence components of current, voltage, or power in a polyphase circuit. I also provide a meter and a switch interposed between this meter and the static network in such a manner that by actuating the switch in one direction or the other, the circuit connections of the meter are so reversed that it measures either the positive or the negative component.

Referring to the accompanying drawings, wherein several embodiments of my invention are shown to facilitate a clearer understanding thereof, Figure 1 is a diagrammatic view of one form of an instrument constructed in accordance with my invention;

Fig. 2 is a similar view of a modification, and

Fig. 3 is a similar view of another modification.

Referring to Figure 1, 1, 2 and 3 are the conductors of a three-phase circuit connecting a generator to a load (not shown). The generator may produce an unbalanced voltage or the load may cause an unbalanced current to traverse the circuit. The modification of my invention shown in this figure is responsive to an unbalanced-current condition. Current transformers 4 and 5 are associated with the conductors 2 and 3. Resistors 6 and 7 and a reactor 8 are connected to the current transformers 4 and 5. A current-responsive device 9, such as an ammeter, is bridged across the resistors and the reactor in series. The current through the resistor 6 is substantially in phase with the applied voltage, whereas the current through the resistor 7 and the reactor 8 lags the applied voltage 60°.

A rotary switch 10, comprising fixed segments 11 and 12 and movable segments 13, is interposed between the transformers 4 and 5 and the network comprising the resistors 6 and 7 and the reactor 8. With the switch 10 in the position shown, and the proper phase-sequence, the ammeter 9 is actuated in accordance with the positive-sequence or direct rotational component of current in the circuit. Upon rotating the switch 10 to the diametrically opposite position, the connections of the meter 9 and the static network to the current transformers 4 and 5 are reversed, and the meter is actuated in accordance with the counter-rotational or negative sequence component of current, assuming that the currents are unbalanced.

It will be understood that the positive sequence component is a measure of the load on the circuit and the negative sequence component is a measure of the degree of unbalance of the phases of the circuit.

The fixed segments 11 serve to short-circuit the current transformers 4 and 5 while the switch is being actuated from one position to the other. This provision is necessary to prevent injuring the current transformers due to the high voltage produced when they are open-circuited.

In Fig. 2 is shown a similar arrangement for measuring either the positive or the negative sequence component of voltage. Obviously, a similar arrangement will provide for measuring the symmetrical components of power, utilizing the principles set forth in my prior application referred to above.

In Fig. 2, voltage transformers 14 and 15 are connected across the conductors 1, 2 and 3 of the circuit. A static network comprising resistors 6 and 7 and a reactor 8 is associated with a voltage-responsive device 16. The current through the resistor 7 and reactor 8 lags the phase voltage 60°. A switch 10 is interposed between the potential transformers 14 and 15 and the static network. The operation of the switch 10 reverses the connections of the potential transformers 14 and 15 so that the device 16 is actuated in accordance with either the positive or the negative sequence component of voltage, as desired.

In Fig. 3 is shown a modified form of current-responsive instrument. Two current transformers 4 and 5 are associated with the conductors 2 and 3 of a polyphase circuit. The static network comprising resistors 6 and 7 and a reactor 8 is connected in a bridge relation to the current-responsive device 9 and the balancing impedance 17. A switch 10 is provided, as before, to reverse the connections of the current transformers 4 and 5 to the static network. In actual practice, an arrangement similar to that shown in Figure 1 would be provided to prevent open-circuiting the transformers 4 and 5 but this is omitted from the drawing for the sake of simplicity. With the switch 10 in the position shown, the ammeter 9 is actuated in accordance with the positive or the negative sequence component of current depending upon the phase sequence of the circuit. When the switch 10 is thrown to the other position, the ammeter 9 is actuated in accordance with the other component. The instrument 9 may be any current-responsive device, such as a relay or a measuring instrument.

It will be apparent that I have devised an instrument by which either one of the two symmetrical components of an unbalanced polyphase system may be obtained at will by throwing a switch. The utility of such a device will be apparent. I do not consider that my invention is limited to the precise details shown and described, as various modifications may be made within the spirit of the invention. I do not wish to be limited in scope, therefore, except by the appended claims.

I claim as my invention:

1. An instrument comprising a current-responsive device, means associated with said device for segregating the positive and negative components of an unbalanced polyphase quantity and means, including a switch having short-circuiting segments, for actuating said device in accordance with either component, as desired.

2. An instrument comprising an electro-responsive device, means including a current transformer associated with said device for segregating the positive and negative symmetrical components of an electrical quantity, and means, including a switch, for actuating said device in accordance with either the positive or negative sequence component, as desired, said switch having means embodied therein for short circuiting said current transformer during an operation of said switch.

In testimony whereof, I have hereunto subscribed my name this 29th day of July 1924.

ROBERT D. EVANS.